US009318908B2

(12) United States Patent
Chang et al.

(10) Patent No.: US 9,318,908 B2
(45) Date of Patent: Apr. 19, 2016

(54) ANTI-THEFT CHARGING SYSTEM

(71) Applicant: DELTA ELECTRONICS, INC., Taoyuan Hsien (TW)

(72) Inventors: Yu-Ming Chang, Taoyuan Hsien (TW); Tsung-Yuan Wu, Taoyuan Hsien (TW)

(73) Assignee: DELTA ELECTRONICS, INC., Taoyuan Hsien (TW)

( * ) Notice: Subject to any disclaimer, the term of this patent is extended or adjusted under 35 U.S.C. 154(b) by 368 days.

(21) Appl. No.: 13/797,005

(22) Filed: Mar. 12, 2013

(65) Prior Publication Data
US 2014/0049214 A1 Feb. 20, 2014

(30) Foreign Application Priority Data

Aug. 20, 2012 (TW) .............................. 101130176 A

(51) Int. Cl.
*H02J 7/00* (2006.01)
*B60L 11/00* (2006.01)
(Continued)

(52) U.S. Cl.
CPC ............. *H02J 7/0047* (2013.01); *B60L 11/007* (2013.01); *B60L 11/1816* (2013.01); *B60L 11/1824* (2013.01); *B60L 15/20* (2013.01); *B60L 15/2054* (2013.01); *B60L 2200/12* (2013.01); *B60L 2270/34* (2013.01); *Y02T 10/645* (2013.01); *Y02T 10/7005* (2013.01); *Y02T 10/7072* (2013.01); *Y02T 10/72* (2013.01);
(Continued)

(58) Field of Classification Search
CPC ............ B60L 2270/30; B60L 2270/34; B60L 2230/12; B60L 2230/16; B60L 11/1825; B60L 11/1816; B60L 11/1824; B60L 11/1818; Y02T 90/16; Y02T 90/14; G08B 13/12; G08B 13/1418; G08B 13/1445; G08B 13/1409; H04M 3/14; H01R 13/665
USPC ........................................ 340/568.3; 439/304
See application file for complete search history.

(56) References Cited

U.S. PATENT DOCUMENTS 6,100,607 A * 8/2000 Olivieri et al. ................. 307/125
6,150,940 A  11/2000 Chapman
(Continued)

FOREIGN PATENT DOCUMENTS

CN          2289350     8/1998
CN        101458858     6/2009
(Continued)

*Primary Examiner* — Robert Grant
*Assistant Examiner* — Harry O'Neill-Becerril
(74) *Attorney, Agent, or Firm* — Kirton McConkie; Evan R. Witt

(57) ABSTRACT

An anti-theft charging system for charging a chargeable battery of an electric vehicle is disclosed and includes a power supplying device, an output terminal assembly, and a burglar-proof detecting device. The power supplying device is used for outputting a charging energy. The output terminal assembly is electrically connected with the power supplying device and detachably coupled to the electric vehicle for receiving and transmitting the charging energy to the chargeable battery. The burglarproof detecting device includes a responding unit disposed within the output terminal assembly for issuing a response signal and a detecting unit disposed within the power supplying device and in signal connection with the responding unit for detecting the response signal. If the output terminal assembly is stolen, the detecting unit realizes that the output terminal assembly is stolen according to a change of the response signal.

9 Claims, 5 Drawing Sheets

(51) Int. Cl.
 *B60L 11/18* (2006.01)
 *B60L 15/20* (2006.01)
(52) U.S. Cl.
 CPC ........... *Y02T 10/7275* (2013.01); *Y02T 90/121* (2013.01); *Y02T 90/14* (2013.01); *Y02T 90/16* (2013.01)

(56) References Cited

U.S. PATENT DOCUMENTS

| | | | | |
|---|---|---|---|---|
| 2002/0193073 | A1* | 12/2002 | Fujioka | H04W 84/20 455/41.1 |
| 2009/0088078 | A1* | 4/2009 | Kim | H04M 1/6066 455/41.2 |
| 2011/0199047 | A1* | 8/2011 | Fujii | B60L 1/04 320/109 |
| 2011/0285528 | A1* | 11/2011 | Weinstein | E05B 19/22 340/539.11 |
| 2012/0109797 | A1* | 5/2012 | Shelton | B60L 3/0069 705/34 |
| 2012/0217928 | A1* | 8/2012 | Kulidjian | B60L 3/0069 320/109 |
| 2012/0280654 | A1* | 11/2012 | Kim | H01M 10/44 320/109 |
| 2013/0320920 | A1* | 12/2013 | Jefferies | G08B 13/1418 320/109 |

FOREIGN PATENT DOCUMENTS

| | | |
|---|---|---|
| CN | 202260491 | 5/2012 |
| CN | 202997650 | 6/2013 |

* cited by examiner

ANTI-THEFT CHARGING SYSTEM

FIELD OF THE INVENTION

The present invention relates to a charging system, and more particularly to a charging system for charging a chargeable battery of an electric vehicle and detecting whether an output terminal assembly is stolen.

BACKGROUND OF THE INVENTION

Gasoline-powered vehicles are widely used for transportation and become indispensible to our daily lives. With rapid development of the related technologies, mass production of gasoline-powered vehicles brings convenience to the human beings. The total number of gasoline-powered vehicles in the world is about 850 millions at present. In addition, 57% of the world's oil consumption (or 67% of the United State's oil consumption) lies in the transportation sector. It is estimated that the total number of gasoline-powered vehicles in the world is about 1.2 billion in 2020. Since there is a net gap between the global oil demand and the oil supply, the unbalance between supply and demand of petroleum energy has become increasingly prominent. It is estimated that the net gap between the global oil demand and the oil supply is nearly twice the world's oil production quantity. Consequently, the oil price is rapidly increased, and the operating cost of the vehicle becomes higher and higher. Nowadays, many countries are actively encouraging the development of new energy vehicles in order to reduce the dependence on oil.

Furthermore, during operations of the gasoline-powered vehicles, the burning of the gasoline may cause air pollution problem and serious environmental problem. For protecting the environment, the manufacturers of vehicles are devoted to the development and research of low pollution vehicles. Among various kinds of new energy vehicles, electric vehicles are more advantageous because of the well-established technologies. In addition, since the power net is widespread over the world, it is convenient to acquire the stable electric energy. As a consequence, electric vehicles are more important in the development of new energy vehicles.

As known, an electric vehicle has a built-in chargeable battery as a stable energy source, and the rechargeable battery can be charged with charging energy supplied from the charging system for providing electric energy to power the electric vehicle. The charging system comprises a charging station and an output terminal assembly including a charging gun and a cable group. The charging station is used for converting the input electric energy into charging energy required for the chargeable battery. The cable group is electrically connected between the charging station and the charging gun. Through the cable group, the charging energy outputted from the charging station is transmitted to the charging gun. The charging gun is detachably inserted into the charging dock of the electric vehicle. When the charging gun is inserted into the charging dock of the electric vehicle, the charging energy from the charging system is transmitted to the chargeable battery to charge the chargeable battery through the charging gun and the cable group.

Due to increasing popularity of electric vehicles, it is necessary to install the charging systems in many places for charging the chargeable batteries of the electric vehicles in real time. As known, the charging gun and the cable group are very expensive and exposed outside the charging system. If the charging system has no burglarproof mechanism, the charging gun and the cable group are easily stolen and thus the operating cost is increased. For preventing the charging gun and the cable group from being stolen, it is necessary to appoint people to guard the charging system. Under this circumstance, the labor cost is also increased.

Therefore, there is a need of providing an anti-theft charging system in order to obviate the drawbacks encountered in the prior art.

SUMMARY OF THE INVENTION

The present invention provides an anti-theft charging system with a burglarproof detecting device. The burglarproof detecting device is a reliable burglarproof detecting device for detecting whether the charging gun and the cable group of the anti-theft charging system is stolen by installing simplified circuitry in the anti-theft charging system. Moreover, the burglarproof detecting device is capable of quickly detecting whether the charging gun and the cable group are stolen in a labor-saving and cost-effective manner.

In accordance with an aspect of the present invention, there is provided an anti-theft charging system for charging a chargeable battery of an electric vehicle. The anti-theft charging system includes a power supplying device, an output terminal assembly, and a burglarproof detecting device. The power supplying device is used for outputting a charging energy. The output terminal assembly is electrically connected with the power supplying device and detachably coupled to the electric vehicle for receiving and transmitting the charging energy to the chargeable battery. The burglarproof detecting device includes a responding unit and a detecting unit. The responding unit is disposed within the output terminal assembly for issuing a response signal, and the detecting unit is disposed within the power supplying device and in signal connection with the responding unit for detecting the response signal. If the output terminal assembly is separated from the power supplying device, the response signal is changed, and the detecting unit realizes that the output terminal assembly is disconnected with the power supplying device according to a change of the response signal.

The above contents of the present invention will become more readily apparent to those ordinarily skilled in the art after reviewing the following detailed description and accompanying drawings, in which:

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1:
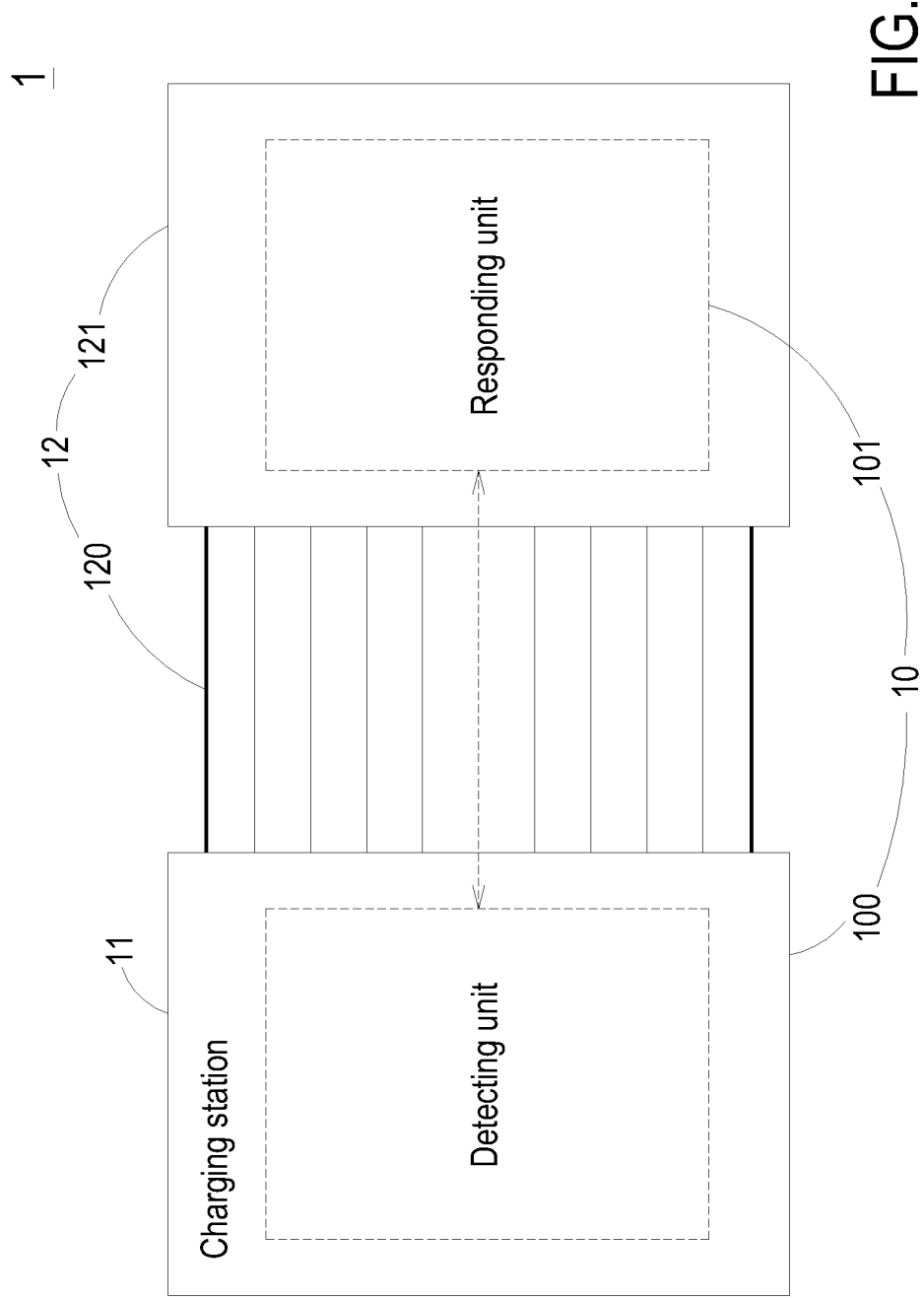
FIG. 1 is a schematic functional block diagram illustrating an anti-theft charging system with a burglarproof detecting device according to an embodiment of the present invention.

FIG. 1 is a schematic functional block diagram illustrating an anti-theft charging system with a burglarproof detecting device according to an embodiment of the present invention. As shown in FIG. 1, the anti-theft charging system 1 is used for charging a chargeable battery (not shown) of an electric vehicle in order to provide electric energy to power the electric vehicle. The anti-theft charging system 1 comprises a burglarproof detecting device 10, a power supplying device 11 (e.g. a charging station), and an output terminal assembly 12. The charging station 11 is used for converting the input electric energy (e.g. the AC electric energy from the utility power source) into DC or AC charging energy required for the chargeable battery. The output terminal assembly 12 is electrically connected with the charging station 11. In addition, the output terminal assembly 12 comprises a cable group 120 and a charging gun 121. The cable group 120 is electrically connected between the charging station 11 and the charging gun 121. The cable group 120 comprises at least one cable. Through the cable group 120, the charging energy outputted from the charging station 11 is transmitted to the charging gun 121. The charging gun 121 is detachably inserted into the charging dock (not shown) of the electric vehicle. Namely, the charging gun 121 is detachably coupled to the electric vehicle. When the charging gun 121 is inserted into the charging dock of the electric vehicle, the charging energy from the output terminal assembly 12 is transmitted to the chargeable battery to charge the chargeable battery.

The burglarproof detecting device 10 is installed in the anti-theft charging system 1 and configured for detecting whether the output terminal assembly 12 is separated from the charging station 11 (i.e. the output terminal assembly 12 is electrically disconnected with the charging station 11) so as to determine whether the output terminal assembly 12 of the anti-theft charging system 1 is stolen. The burglarproof detecting device 10 comprises a detecting unit 100 and a responding unit 101. The responding unit 101 is disposed within the output terminal assembly 12. For example, the responding unit 101 is disposed within the charging gun 121 for outputting a response signal. For example, the response signal is constituted by an impedance change. Alternatively, the response signal is a wireless signal. The detecting unit 100 is disposed within the charging station 11. The detecting unit 100 is in signal connection with the responding unit 101 in a wired transmission manner or a wireless transmission manner. As shown in FIG. 1, the communication between the detecting unit 100 and the responding unit 101 is indicated by a dashed line. The detecting unit 100 is used for detecting the response signal from the responding unit 101. If the output terminal assembly 12 is stolen, the response signal is correspondingly changed. According to a change of the response signal, the detecting unit 100 realizes that the output terminal assembly 12 is disconnected with the charging station 11 and the output terminal assembly 12 is stolen.

Hereinafter, some examples of the burglarproof detecting device used in the anti-theft charging system will be illustrated in more details.

Figure 2:
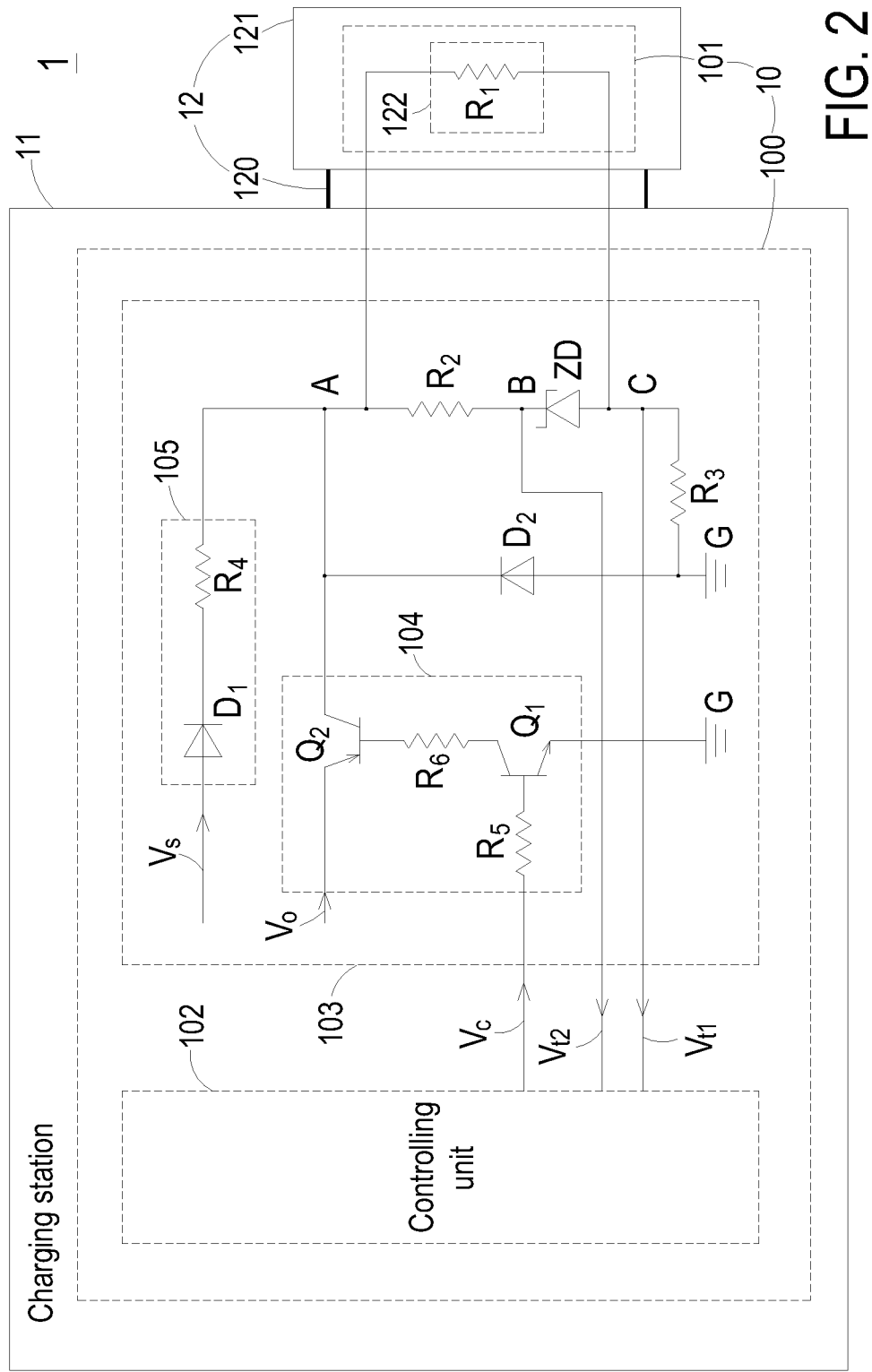
FIG. 2 is a schematic circuit diagram illustrating a burglarproof detecting device according to a first embodiment of the present invention.

FIG. 2 is a schematic circuit diagram illustrating a burglarproof detecting device according to a first embodiment of the present invention. The burglarproof detecting device 10 is used for detecting whether the output terminal assembly 12 is separated from the charging station 11 by a contact-type detecting mechanism, thereby determining whether the output terminal assembly 12 is stolen. The responding unit 101 comprises a first resistor $R_1$, which is included in the charging gun 121. The first resistor $R_1$ may be implemented by the impedance of a solenoid switch 122 included in the charging gun 121. When the charging gun 121 is inserted into the charging dock of the electric vehicle to charge the chargeable battery of the electric vehicle, the solenoid switch 122 is electrically magnetized. Consequently, the muzzle of the charging gun 121 and the charging dock are locked in order to avoid detachment of the charging gun 121 from the charging dock. Preferably, the impedance value of the first resistor $R_1$ is 50 ohms, but it is not limited thereto.

The detecting unit 100 comprises a controlling unit 102 and an impedance detecting unit 103. The impedance detecting unit 103 is electrically connected with the controlling unit 102. The output terminals of the impedance detecting unit 103 are electrically connected with the first resistor $R_1$ through the cable group 120. The operations of the impedance detecting unit 103 are controlled by the controlling unit 102. The impedance detecting unit 103 may issue a first detecting signal $V_{t1}$ and a second detecting signal $V_{t2}$ to the controlling unit 102. In a case that the anti-theft charging system 1 and the charging gun 121 are in the operating mode, the first detecting signal $V_{t1}$ reflects whether the impedance of the first resistor $R_1$ is changed. In a case that the anti-theft charging system 1 and the charging gun 121 are in the standby mode, the second detecting signal $V_{t2}$ reflects whether the impedance of the first resistor $R_1$ is changed.

The controlling unit 102 is electrically connected with the impedance detecting unit 103 for outputting a control signal $V_c$ to the impedance detecting unit 103. In response to a high-level state or a low-level state of the control signal $V_c$, the action of the impedance detecting unit 103 is correspondingly controlled. Moreover, when the anti-theft charging system 1 and the charging gun 121 are in the operating mode, the controlling unit 102 may detect whether the impedance of the first resistor $R_1$ is changed according to the first detecting signal $V_{t1}$ so as to detect whether the output terminal assembly 12 is separated from the charging station 11, thereby determining whether the output terminal assembly 12 is stolen. Whereas, when the anti-theft charging system 1 and the charging gun 121 are in the standby mode, the controlling unit 102 may detect whether the impedance of the first resistor $R_1$ is changed according to the second detecting signal $V_{t2}$ so as to detect whether the output terminal assembly 12 is separated from the charging station 11, thereby determining whether the output terminal assembly 12 is stolen.

In this embodiment, the impedance detecting unit 103 comprises a switching circuit 104, a protecting circuit 105, a second resistor $R_2$, a Zener diode ZD, and a third resistor $R_3$. The control terminal of the switching circuit 104 is electrically connected with the controlling unit 102 for receiving the control signal $V_c$. The input conduction terminal of the switching circuit 104 receives a driving voltage $V_o$. The driving voltage $V_o$ is used for driving the solenoid switch 122, and the driving voltage $V_o$ is 12V preferably. The output conduction terminal of the switching circuit 104 is electrically connected with a first end of the first resistor $R_1$ of the solenoid switch 122. According to the control signal $V_c$ from the controlling unit 102, the switching circuit 104 is selectively turned on or turned off. In a case that the switching circuit 104 is turned on, the electric energy of the driving voltage $V_o$ may be transmitted to the solenoid switch 122 and the first resistor $R_1$ through the switching circuit 104, thereby enabling the solenoid switch 122. Moreover, the switching circuit 104 is also connected with a ground terminal G.

In this embodiment, as shown in FIG. 2, the switching circuit 104 comprises a NPN bipolar junction transistor $Q_1$ and a PNP bipolar junction transistor $Q_2$. The base of the NPN bipolar junction transistor $Q_1$ is electrically connected with the controlling unit 102 for receiving the control signal $V_c$. The collector of the NPN bipolar junction transistor $Q_1$ is electrically connected with the base of the PNP bipolar junction transistor $Q_2$. The emitter of the NPN bipolar junction transistor $Q_1$ is connected with the ground terminal G The emitter of the PNP bipolar junction transistor $Q_2$ receives the driving voltage $V_o$. The collector of the PNP bipolar junction transistor $Q_2$ is connected with the first resistor $R_1$. That is, the base of the NPN bipolar junction transistor $Q_1$ is the control terminal of the switching circuit 104, the emitter of the PNP bipolar junction transistor $Q_2$ is the input conduction terminal of the switching circuit 104, and the collector of the PNP bipolar junction transistor $Q_2$ is the output conduction terminal of the switching circuit 104. The switching circuit 104 is connected with the ground terminal G through the emitter of the NPN bipolar junction transistor $Q_1$.

The input terminal of the protecting circuit 105 receives a standby voltage $V_s$. The standby voltage $V_s$ is continuously supplied to the protecting circuit 105. In a case that the anti-theft charging system 1 is in the standby mode, the standby voltage $V_s$ provides standby electric energy to the electronic components of the anti-theft charging system 1. For example, the standby voltage $V_s$ is 3V, but it is not limited thereto. The output terminal of the protecting circuit 105 is connected with the first end of the first resistor $R_1$. The protecting circuit 105 is used for outputting the standby voltage V, and capable of preventing the inverse current from being flowing into the output terminal of the protecting circuit 105. In addition, when the output terminal assembly 12 is in short-circuit, the protecting circuit 105 is used for maintaining the standby voltage $V_s$. In this embodiment, the protecting circuit 105 comprises a first diode $D_1$ and a fourth resistor $R_4$. The standby voltage $V_s$ is received by an anode of the first diode $D_1$. The cathode of the first diode $D_1$ is connected with a first end of the fourth resistor $R_4$. The first diode $D_1$ is used for preventing the inverse current from being flowing into the output terminal of the protecting circuit 105. The second end of the fourth resistor $R_4$ is electrically connected with a first node A. When the output terminal assembly 12 is in short-circuit, the fourth resistor $R_4$ is used for maintaining the standby voltage $V_s$. Preferably, the impedance value of the fourth resistor $R_4$ is 1K ohms. In another embodiment, the fourth resistor $R_4$ can be omitted (not shown in FIG. 2).

The first end of the second resistor $R_2$, the protecting circuit 105, the output conduction terminal of the switching circuit 104, and the first end of the first resistor $R_1$ are electrically connected with first node A. The second end of the second resistor $R_2$, the cathode of the Zener diode ZD and the controlling unit 102 are electrically connected with a second node B. The second resistor $R_2$ is used as a current-limiting resistor for preventing the Zener diode ZD from burning when the Zener diode ZD conducts large currents in the breakdown conduction state. Preferably, the impedance value of the second resistor $R_2$ is 10K ohms. The anode of the Zener diode ZD, the second end of the first resistor $R_1$, the first end of the third resistor $R_3$ and the controlling unit 102 are electrically connected with a third node C. The second end of the third resistor $R_3$ is electrically connected with the ground terminal G The Zener diode ZD is configured for clamping voltage. The first detecting signal $V_{t1}$ is outputted from the third node C to the controlling unit 102. The second detecting signal $V_{t2}$ is outputted from the second node B to the controlling unit 102.

Hereinafter, the operations of the burglarproof detecting device 10 will be illustrated with reference to FIG. 2. In a case that the anti-theft charging system 1 is in the operating mode to charge the chargeable battery of the electric vehicle by the charging gun 121, the control signal $V_c$ in the high-level state is transmitted from the controlling unit 102 to the control terminal of the switching circuit 104. In response to the high-level state of the control signal $V_c$, the switching circuit 104 is turned on. Consequently, the electric energy of the driving voltage $V_o$ is transmitted to the solenoid switch 122 of the charging gun 121 through the switching circuit 104, thereby electrically magnetizing the solenoid switch 122. When the solenoid switch 122 is electrically magnetized, the muzzle of the charging gun 121 and the charging dock of the electric vehicle are both locked to prevent detachment of the charging gun 121. Meanwhile, the driving voltage $V_o$ results in breakdown conduction of the Zener diode ZD. Under this circumstance, the voltage of the first detecting signal $V_{t1}$ at the third node C is corresponding to a divided voltage of the driving voltage $V_o$ across the first resistor $R_1$ and the third resistor $R_3$ and corresponding to a voltage drop generated from supplying the driving voltage $V_o$ across the second resistor $R_2$, the Zener diode ZD and the third resistor $R_3$. However, the second resistor $R_2$ has a high impedance value, which is relatively higher than those of the first resistor $R_1$ and the third resistor $R_3$, the voltage of the first detecting signal $V_{t1}$ can be viewed as corresponding to the divided voltage of the driving voltage $V_o$ across the first resistor $R_1$ and the third resistor $R_3$. Consequently, the voltage of the first detecting signal $V_{t1}$ at the third node C is maintained in a first normal voltage range. For example, the voltage of the first detecting signal $V_{t1}$ at the third node C is maintained at about 0.24V.

When the anti-theft charging system 1 and the charging gun 121 are in the operating mode, if the output terminal assembly 12 is cut off (for example the charging gun 121 or the cable group 120 is cut off) by a thief, the first resistor $R_1$ is in an open loop state with respect to the impedance detecting unit 103. Meanwhile, the impedance of the first resistor $R_1$ is infinite Under this circumstance, the voltage of the first detecting signal $V_{t1}$ at the third node C is only corresponding to the voltage drop generated from supplying the driving voltage $V_o$ across the second resistor $R_2$, the Zener diode ZD and the third resistor $R_3$. In addition, the second resistor $R_2$ is a high impedance resistor. Therefore, the voltage of the first detecting signal $V_{t1}$ at the third node C is for example about 0V. Under this circumstance, the voltage of the first detecting signal $V_{t1}$ at the third node C is no longer maintained in the first normal voltage range. Since the voltage level of the first detecting signal $V_{t1}$ is changed, the controlling unit 102 judges that the out terminal assembly 12 is separated from the charging station 11 and the output terminal assembly 12 is stolen. Furthermore, the controlling unit 102 will enable an alert device (not shown) to generate a warning signal.

Furthermore, in a case that the anti-theft charging system 1 and the charging gun 121 are in the standby mode, the control signal $V_c$ in the low-level state is transmitted from the controlling unit 102 to the control terminal of the switching circuit 104. In response to the low-level state of the control signal $V_c$, the switching circuit 104 is turned off. Meanwhile, the electric energy at the first node A can be provided by the driving voltage $V_o$ through the protecting circuit 105. Due to that the voltage level of the driving voltage $V_o$ is relatively low, the electric energy at the first node A can't drive the breakdown conduction of the Zener diode ZD. Under this circumstance, the voltage at the first node A is constituted of a divided voltage of the driving voltage $V_o$ across the fourth resistor $R_4$, the first resistor $R_1$ and the third resistor $R_3$. The voltage at the node A is about 0.14V. Consequently, the voltage of the second detecting signal $V_{t2}$ at the second node B is corresponding to the voltage at the first node A and maintained in a second normal voltage range. For example, the voltage of the second detecting signal $V_{t2}$ at the second node B is maintained at about 0.14V.

When the anti-theft charging system 1 and the charging gun 121 are in the standby mode, if the output terminal assembly 12 is cut off (for example the charging gun 121 or the cable group 120 is cut off) by a thief, the first resistor $R_1$ is in an open loop state with respect to the impedance detecting unit 103. Meanwhile, the impedance of the first resistor $R_1$ is infinite Due to that the breakdown conduction of the Zener diode ZD is disable, there is no current transmitted from the first node A to the second resistor $R_2$. Therefore, the voltage level of the second detecting signal $V_c$ at the second node B is the same as the voltage level at the first node A. For example, the voltage level of the second detecting signal $V_{t2}$ at the second node B is equal to the standby voltage $V_s$ minus a conduction voltage of the first diode $D_1$. The voltage level of the second detecting signal $V_{t2}$ is less than 3V. Under this circumstance, the voltage level of the second detecting signal $V_{t2}$ is changed. Since the voltage level of the second detecting signal $V_{t2}$ is changed, the controlling unit 102 judges that the output terminal assembly 12 is separated from the charging station 11 and the output terminal assembly 12 is stolen. Furthermore, the controlling unit 102 will enable an alert device (not shown) to generate a warning signal.

In an embodiment, when the anti-theft charging system 1 and the charging gun 121 are in the standby mode, if the voltage level of the second detecting signal $V_{t2}$ is more than 3V (for example above 5V) for enabling the Zener diode ZD to be conducted and if the output terminal assembly 12 is cut off by a thief, the voltage of the second detecting signal $V_{t2}$ at the second node B is no longer maintained in the second normal voltage range and changed to equal to a breakdown voltage of the Zener diode ZD for example 3V. Since the voltage level of the second detecting signal $V_{t2}$ is changed, the controlling unit 102 judges that the output terminal assembly 12 is separated from the charging station 11 and the output terminal assembly 12 is stolen.

From the above discussions about the burglarproof detecting device 10 of FIG. 2, the first resistor $R_1$ of the responding unit 101 is implemented by the impedance of the solenoid switch 122 of the charging gun 121. The impedance change of the first resistor $R_1$, which is resulted from the connection and separation states between the output terminal assembly 12 and the charging station 11, is detected by a contact-type detecting mechanism. According to the impedance change of the first resistor $R_1$ detected by the impedance detecting unit 103, the controlling unit 102 may judge whether the output terminal assembly 12 is stolen or not. In other words, the impedance change of the first resistor $R_1$ detected by the impedance detecting unit 103 constitutes a response signal. The response signal may be provided by the responding unit 101. If the output terminal assembly 12 is stolen, the response signal is correspondingly changed. Consequently, the detecting unit 100 can detect whether the output terminal assembly 12 is separated from the charging station 11 so as to judge whether the output terminal assembly 12 is stolen according to a change of the response signal.

Please refer to FIG. 2 again. In some embodiments, the switching circuit 104 further comprises a fifth resistor $R_5$ and a sixth resistor $R_6$. The fifth resistor $R_5$ is electrically connected between the base of the NPN bipolar junction transistor $Q_1$ and the controlling unit 102. The sixth resistor $R_6$ is electrically connected between the collector of the NPN bipolar junction transistor $Q_1$ and the base of the PNP bipolar junction transistor $Q_2$. The impedance detecting unit 103 further comprises a second diode $D_2$. The anode of the second diode $D_2$ is electrically connected with the ground terminal G and the second end of the third resistor $R_3$. The cathode of the second diode $D_2$ is electrically connected with the output conduction terminal of the switching circuit 104, the first end of the second resistor $R_2$ and the first end of the first resistor $R_1$.

Figure 3:
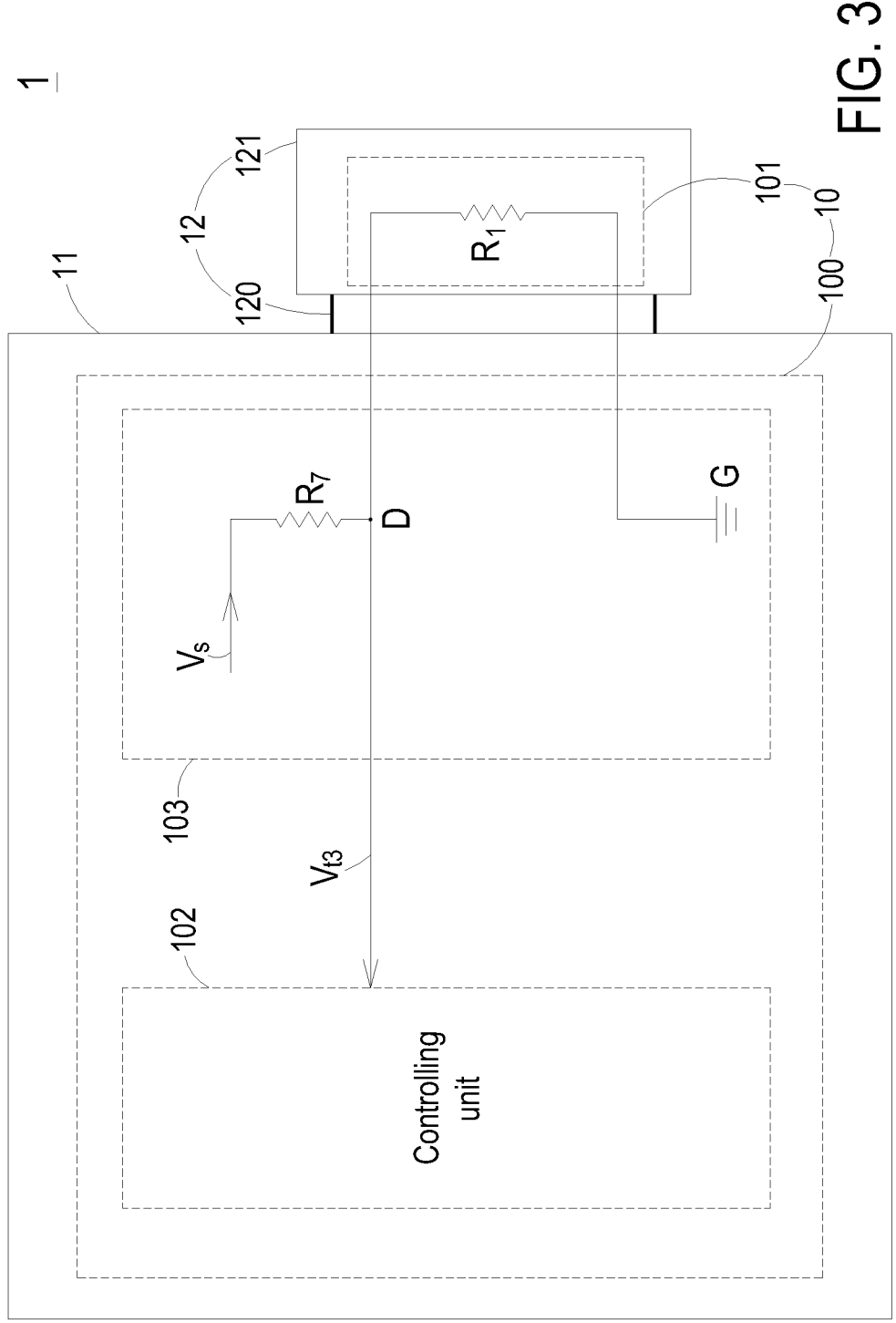
FIG. 3 is a schematic circuit diagram illustrating a burglarproof detecting device according to a second embodiment of the present invention.

In the first embodiment, the first resistor R1 is implemented by the impedance of the solenoid switch 122 of the charging gun 121. It is noted that numerous modifications and alterations may be made while retaining the teachings of the invention. FIG. 3 is a schematic circuit diagram illustrating a burglarproof detecting device according to a second embodiment of the present invention. In this embodiment, the first resistor R1 is implemented by a thermistor, a temperature switch or an additional finite resistance of the charging gun 121. Preferably, the impedance value of the first resistor R1 is ranged from 1K ohms to 10K ohms. Under this circumstance, the impedance detecting unit 103 only comprises a seventh resistor R7. A first end of the seventh resistor R7 receives the standby voltage Vs. The standby voltage Vs is continuously supplied to the fourth node D. In a case that the anti-theft charging system 1 is in the standby mode, the standby voltage Vs provides standby electric energy to the electronic components of the anti-theft charging system 1. The second end of the seventh resistor R7 and the first end of the first resistor R1 are connected with the fourth node D through the cable of the cable group 120. Preferably, the impedance value of the seven resistor R7 is for example 10K ohms. In comparison with the anti-theft charging system of FIG. 2, the controlling unit 102 of the anti-theft charging system 1 is further electrically connected with the fourth node D. According to the voltage of a third detecting signal Vt3 at the fourth node D, the controlling unit 102 may detect whether the impedance of the first resistor R1 is changed according to the third detecting signal Vt3, thereby detecting whether the output terminal assembly 12 is separated from the charging station 11 to determine whether the output terminal assembly 12 is stolen.

In this embodiment, since the first resistor $R_1$ is not implemented by the impedance of the solenoid switch 122 of the charging gun 121, the associated circuitry for driving the solenoid switch 122 in the impedance detecting unit 103 may be omitted. That is, the switching circuit 104 and some other circuits as shown in FIG. 2 are exempted from the impedance detecting unit 103 of FIG. 3. Consequently, the circuitry configuration of the anti-theft charging system of this embodiment is simplified and cost-effective. Moreover, when the output terminal assembly 12 is connected with the charging station 11, regardless of whether the anti-theft charging system 1 is in the operating mode or the standby mode, the voltage of the third detecting signal $V_{t3}$ at the fourth node D can be maintained in a third normal voltage range according to the divided voltage of the standby voltage $V_s$ with respect to the seventh resistor $R_7$ and the first resistor $R_1$.

When the anti-theft charging system 1 and the charging gun 121 are in the operating mode or the standby mode, if the output terminal assembly 12 is cut off (for example the charging gun 121 or the cable group 120 is cut off) by a thief, the first resistor $R_1$ is in an open loop state with respect to the impedance detecting unit 103. Meanwhile, the impedance of the first resistor $R_1$ is infinite. As the impedance of the first resistor $R_1$ is changed, the voltage level of the third detecting signal $V_{t3}$ at the fourth node D is correspondingly changed and equal to the voltage level of the standby voltage $V_s$. Under this circumstance, the voltage of the third detecting signal $V_{t3}$ at the fourth node D is no longer maintained in the third normal voltage range. Since the voltage level of the third detecting signal $V_{r3}$ is changed, the controlling unit 102 detects that the output terminal assembly 12 is separated from the charging station 11, thereby judging that the output terminal assembly 12 is stolen. Furthermore, the controlling unit 102 will enable an alert device (not shown) to generate a warning signal.

Figure 4:
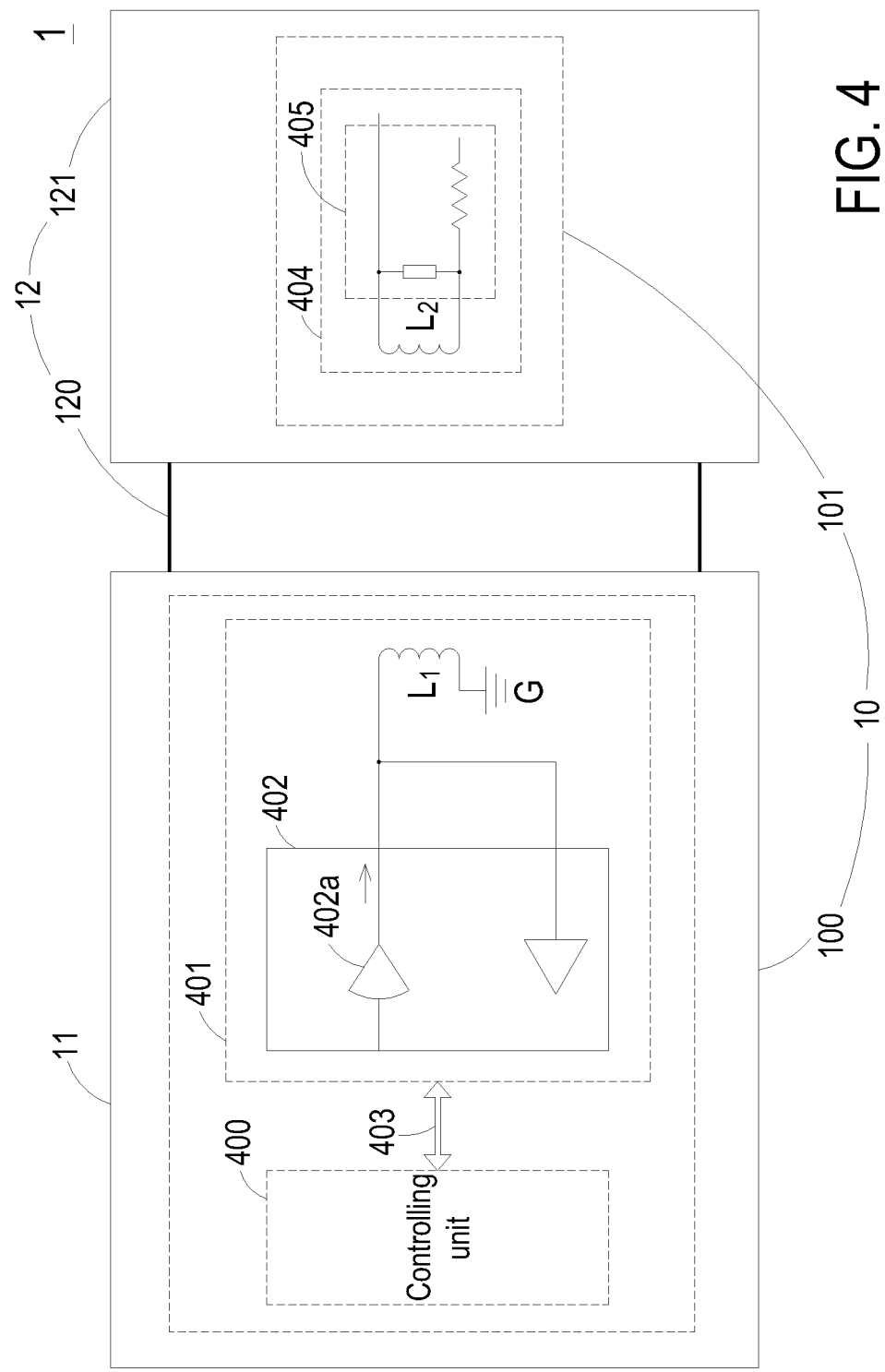
FIG. 4 is a schematic circuit diagram illustrating a burglarproof detecting device according to a third embodiment of the present invention.

FIG. 4 is a schematic circuit diagram illustrating a burglarproof detecting device according to a third embodiment of the present invention. In this embodiment, the burglarproof detecting device 10 is used for detecting whether the output terminal assembly 12 is separated from the charging station in a radio frequency identification (RFID) wireless detecting manner, thereby determining whether the output terminal assembly 12 is stolen. The detecting unit 100 of the burglarproof detecting device 10 is installed in the charging station 11, and comprises a controlling unit 400 and a reader 401. The reader 401 comprises a first wireless radio frequency module 402 and a first antenna $L_1$. The first antenna $L_1$ is electrically connected with a ground terminal G A transmitting terminal 402a of the first wireless radio frequency module 402 is electrically connected with the first antenna $L_1$. The transmitting terminal 402a of the first wireless radio frequency module 402 is used for driving the first antenna $L_1$ to emit a radio frequency signal. The controlling unit 400 is connected with the reader 401 through a communication interface 403. Moreover, the controlling unit 400 is in communication with the first wireless radio frequency module 402 through the communication interface 403.

In this embodiment, the responding unit 101 is installed in the charging gun 121, and comprises a receiver 404. For example, the receiver 404 is a tag. The receiver 404 comprises a second wireless radio frequency module 405 and a second antenna $L_2$. The second antenna $L_2$ is electrically connected with the second wireless radio frequency module 405 and the ground terminal G In a case that the distance between the second antenna $L_2$ and the first antenna $L_1$ is smaller than a first safety distance, the second antenna $L_2$ and the first antenna $L_1$ are interacted with each other to result in an electromagnetic coupling effect. When the second wireless radio frequency module 405 receives electric energy, the second wireless radio frequency module 405 is enabled to issue an information signal. The information signal may be outputted through the second antenna $L_2$ in a wireless transmission manner.

Hereinafter, the operations of the burglarproof detecting device will be illustrated with reference to FIG. 4. Firstly, the transmitting terminal 402a of the first wireless radio frequency module 402 of the reader 401 continuously or periodically drives the first antenna $L_1$ to emit a radio frequency signal with a constant frequency. In a case that the output terminal assembly 12 is not separated from the charging station 11, the distance between the second antenna $L_2$ of the receiver 404 and the first antenna $L_1$ of the reader 401 is smaller than the first safety distance. Consequently, the second antenna $L_2$ and the first antenna $L_1$ are interacted with each other to result in an electromagnetic coupling effect. Due to the electromagnetic coupling effect, an induction current flows to the second wireless radio frequency module 405. Since the second wireless radio frequency module 405 receives electric energy, the second wireless radio frequency module 405 is enabled to issue an information signal. The information signal includes the ubiquitous identification code (UID). The information signal is in a form of a carrier signal, and outputted through the second antenna $L_2$. After the carrier signal (i.e. the information signal) from the receiver 404 is received by the first wireless radio frequency module 402 of the reader 401 through the first antenna $L_1$, the carrier signal is demodulated and decoded. In addition, the reader 401 will issue a notification signal through the communication interface 403 to inform the controlling unit 400 that the carrier signal from the receiver 404 is being received. According to the notification signal, the controlling unit 400 judges that the output terminal assembly 12 is not separated from the charging station 11.

Whereas, in a case that the output terminal assembly 12 is cut off (for example the charging gun 121 or the cable group 120 is cut off) by a thief and the output terminal assembly 12 is taken away, the distance between the second antenna $L_2$ and the first antenna $L_1$ is greater than the first safety distance. Meanwhile, since no electromagnetic coupling effect is generated by the second antenna $L_2$ and the first antenna $L_1$, no induction current is generated. Since the second wireless radio frequency module 405 fails to receive enough electric energy, the second wireless radio frequency module 405 is disabled. Under this circumstance, the information signal including the ubiquitous identification code (UID) fails to be issued to the first wireless radio frequency module 402. Since no carrier signal from the receiver 404 is received by the first wireless radio frequency module 402, the reader 401 will issue a notification signal through the communication interface 403 to inform the controlling unit 400 that the carrier signal from the receiver 404 fails to be received. Consequently, the controlling unit 400 judges that the output terminal assembly 12 is separated from the charging station 11 for determining that the output terminal assembly 12 is stolen. Furthermore, the controlling unit 400 will enable an alert device (not shown) to generate a warning signal.

From the above discussions about the burglarproof detecting device 10 of FIG. 4, the information signal from the second wireless radio frequency module 405 constitutes the response signal of the responding unit 101. When the output terminal assembly 12 is separated from the charging station 11 (i.e. the output terminal assembly 12 is stolen) and the distance between the second antenna $L_2$ and the first antenna $L_1$ is greater than the first safety distance, the response signal is correspondingly changed. That is, there is a response signal originally, and there is no response signal after the output terminal assembly 12 is stolen.

Figure 5:
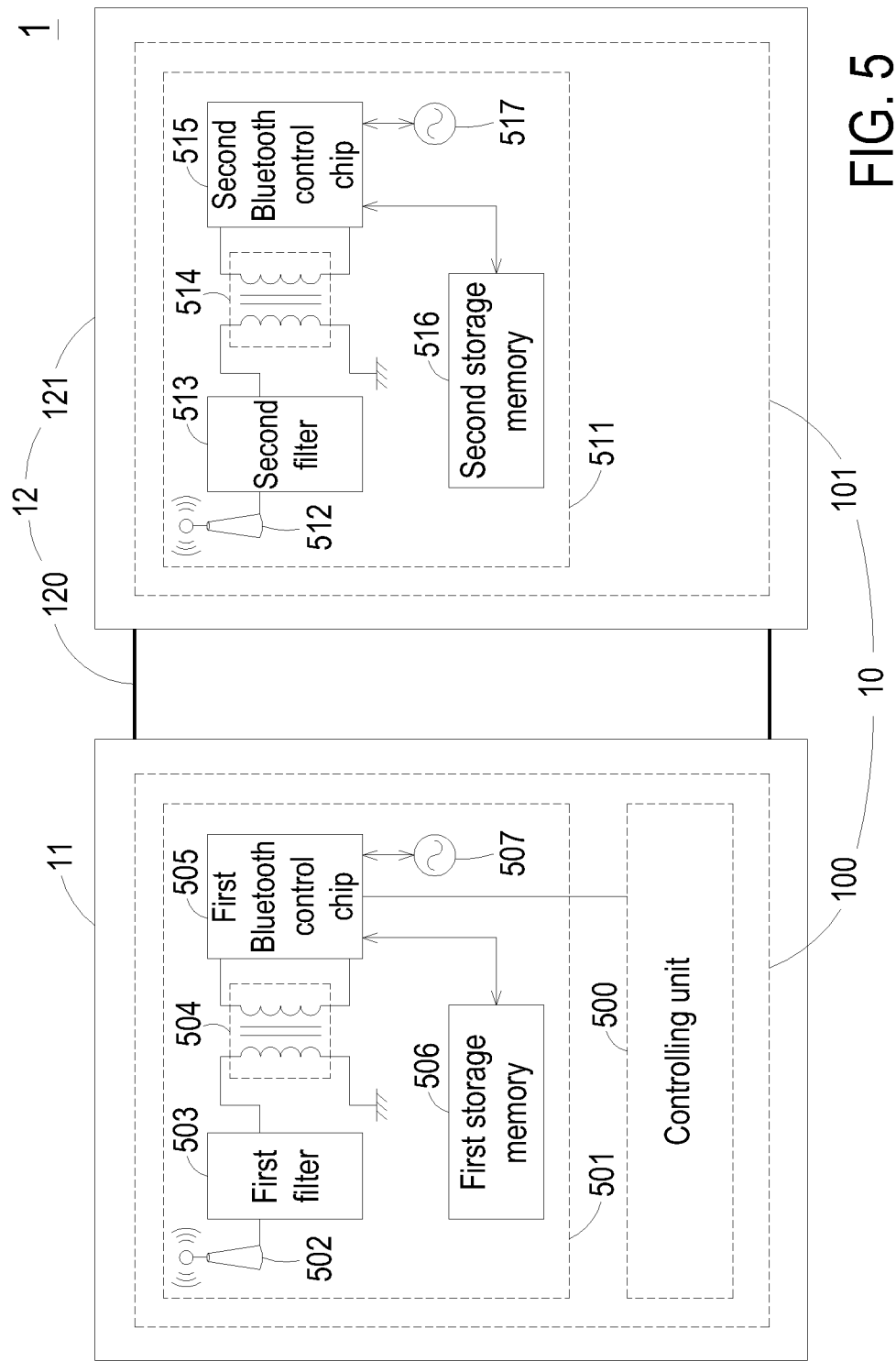
FIG. 5 is a schematic circuit diagram illustrating a burglarproof detecting device according to a fourth embodiment of the present invention.

FIG. 5 is a schematic circuit diagram illustrating a burglarproof detecting device according to a fourth embodiment of the present invention. In this embodiment, the burglarproof detecting device 10 is used for detecting whether the output terminal assembly 12 is separated from the charging station 11 in a wireless transmission communication wireless detecting manner, thereby determining whether the output terminal assembly 12 is stolen. The detecting unit 100 of the burglarproof detecting device 10 is installed in the charging station 11, and comprises a controlling unit 500 and a first wireless transmission module 501. The first wireless transmission module 501 is set as the master terminal. In this embodiment, the first wireless transmission module 501 comprises a third antenna 502, a first filter 503, a first Balun 504, a first wireless transmission control chip 505, a first storage memory 506, and a first clock generator 507. The first clock generator 507 is electrically connected with the first wireless transmission control chip 505 for issuing a clock signal to the first wireless transmission control chip 505. The action of the first wireless transmission control chip 505 is determined according to the clock signal. The first storage memory 506 is electrically connected with the first wireless transmission control chip 505 for providing a storage space. Consequently, the first wireless transmission control chip 505 may store data into the first storage memory 506 or read data from the first storage memory 506. The first wireless transmission control chip 505 is used for transmitting or receiving a first wireless signal. The first Balun 504 is electrically connected with the first wireless transmission control chip 505. The first Balun 504 is used for converting and adjusting the wireless signal outputted from or received by the first wireless transmission control chip 505. Consequently, the signal transmission mode and the impedance of the wireless signal can comply with the wireless transmission communication protocol. An example of the first Balun 504 includes but is not limited to a 2.4GHz matching circuit. The first filter 503 is connected between the first Balun 504 and the third antenna 502 for filtering the signal. The wireless signal from the first wireless transmission control chip 505 may be outputted to the surroundings through the third antenna 502, or the external wireless signal may be received by the third antenna 502. The controlling unit 500 is electrically connected with the first wireless transmission control chip 505. In addition, the controlling unit 500 may communicate with the first wireless transmission control chip 505.

The responding unit 101 is installed in the charging gun 121, and comprises a second wireless transmission module 511. The second wireless transmission module 511 may be set a slave terminal. In this embodiment, the second wireless transmission module 511 comprises a fourth antenna 512, a second filter 513, a second Balun 514, a second wireless transmission control chip 515, a second storage memory 516, and a second clock generator 517. The configurations and operations of the fourth antenna 512, the second filter 513, the second Balun 514, the second wireless transmission control chip 515, the second storage memory 516 and the second clock generator 517 of the second wireless transmission module 511 are similar to those of the third antenna 502, the first filter 503, the first Balun 504, the first wireless transmission control chip 505, the first storage memory 506 and the first clock generator 507 of the first wireless transmission module 501, and are not redundantly described herein.

In this embodiment, the first wireless transmission module 501 and the second wireless transmission module 511 are operated in the ISM 2.4 GHz spectrum. Moreover, the first wireless transmission module 501 and the second wireless transmission module 511 are interacted with each other to read information through wireless radio frequency by a FHHS frequency-hopping method.

Hereinafter, the operations of the burglarproof detecting device will be illustrated with reference to FIG. 5. After the charging station 11 of the anti-theft charging system 1 is powered on, the first wireless transmission module 501 (i.e. the master terminal) issues a first wireless signal. In a case that the output terminal assembly 12 is not separated from the charging station 11, the distance between the first wireless transmission module 501 and the second wireless transmission module 511 is smaller than a second safety distance. After the first wireless signal from the first wireless transmission module 501 is received by the second wireless transmission module 511 (i.e. the slave terminal), the second wireless transmission module 511 issues a second wireless signal to the first wireless transmission module 501. Under this circumstance, a piconet is formed between the first wireless transmission module 501 and the second wireless transmission module 511.

Whereas, in a case that the output terminal assembly 12 is cut off (for example the charging gun 121 or the cable group 120 is cut off) by a thief and the output terminal assembly 12 is taken away, the distance between the first wireless transmission module 501 and the second wireless transmission module 511 is greater than the second safety distance. That is, the distance between the first wireless transmission module 501 and the second module 511 is beyond the piconet range, so that the piconet is interrupted. Under this circumstance, the second wireless signal from the second wireless transmission module 511 fails to be received by the first wireless transmission module 501. Since the second wireless signal is not received by the first wireless transmission module 501, the first wireless transmission control chip 505 will issue a notification signal to inform the controlling unit 500 that the communication between the first wireless transmission module 501 and the second wireless transmission module 511 is interrupted. Consequently, the controlling unit 500 judges that the output terminal assembly 12 is separated from the charging station 11 for determining that the output terminal 12 is stolen. Furthermore, the controlling unit 500 will enable an alert device (not shown) to generate a warning signal.

From the above discussions about the burglarproof detecting device 10 of FIG. 5, the second wireless signal from the second wireless transmission module 511 constitutes the response signal of the responding unit 101. When the output terminal assembly 12 is separated from the charging station 11 (i.e. the output terminal assembly 12 is stolen) and the distance between the first wireless transmission module 501 and the second wireless transmission module 511 is greater than the second safety distance, the response signal is correspondingly changed. That is, there is a response signal originally, and there is no response signal after the output terminal assembly 12 is stolen.

From the above description, the present invention provides an anti-theft charging system with the burglarproof detecting device. The burglarproof detecting device is a reliable burglarproof detecting device by installing simplified circuitry in the anti-theft charging system. The burglarproof detecting device is used for detecting whether the output terminal assembly is separated from the charging station so as to determine whether the output terminal assembly is stolen in a wired transmission manner or a wireless transmission manner. Consequently, the burglarproof detecting device of the present invention is capable of quickly detecting whether the output terminal assembly is stolen in a labor-saving and cost-effective manner. Moreover, if the output terminal assembly is stolen, the burglarproof detecting device may generate a warning signal in order to reduce the possibility of losing the output terminal assembly.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. An anti-theft charging system for charging a chargeable battery of an electric vehicle, said anti-theft charging system comprising:
   a power supplying device for outputting a charging energy;
   an output terminal assembly electrically connected with said power supplying device and detachably coupled to said electric vehicle for receiving and transmitting said charging energy to said chargeable battery; and
   a burglarproof detecting device comprising a responding unit and a detecting unit, wherein said responding unit is disposed within said output terminal assembly for issuing a response signal, and said detecting unit is disposed within said power supplying device and in signal connection with said responding unit for detecting said response signal;

wherein said output terminal assembly further comprises a cable group and a charging gun, wherein said cable group is electrically connected between said power supplying device and said charging gun, and said responding unit is disposed within said charging gun;

wherein said responding unit comprises a first resistor, wherein an impedance change of said first resistor constitutes said response signal;

wherein said detecting unit comprises:
an impedance detecting unit electrically connected with said first resistor for outputting a first detecting signal and a second detecting signal, wherein when said anti-theft charging system is in an operating mode, said first detecting signal reflects whether an impedance of said first resistor is changed, wherein when said anti-theft charging system is in a standby mode, said second detecting signal reflects whether an impedance of said first resistor is changed; and a controlling unit electrically connected with said impedance detecting unit for outputting a control signal to said impedance detecting unit, thereby controlling a corresponding action of said impedance detecting unit, wherein when said anti-theft charging system is in said operating mode, said controlling unit judges whether said output terminal assembly is separated from said power supplying device according to a change of said first detecting signal, wherein when said anti-theft charging system is in said standby mode, said controlling unit judges whether said output terminal assembly is separated from said power supplying device according to a change of said second detecting signal.

2. The anti-theft charging system according to claim 1, wherein said first resistor is implemented by an impedance of a solenoid switch within said charging gun.

3. The anti-theft charging system according to claim 2, wherein said impedance detecting unit comprises a switching circuit, wherein a control terminal of said switching circuit is electrically connected with said controlling unit for receiving said control signal, an input conduction terminal of said switching circuit receives a driving voltage, and an output conduction terminal of said switching circuit is electrically connected with a first end of said first resistor of said solenoid switch, wherein said switching circuit is selectively turned on or turned off according to said control signal, wherein when said switching circuit is turned on, the electric energy of said driving voltage is transmitted to said solenoid switch, thereby enabling said solenoid switch.

4. The anti-theft charging system according to claim 3, wherein said impedance detecting unit further comprises:
a protecting circuit electrically connected with said first end of said first resistor for receiving and transmitting a standby voltage for preventing a reverse current and maintaining said standby voltage when said output terminal assembly is in short-circuit;

a second resistor, wherein a first end of said second resistor, said protecting circuit, said output conduction terminal of said switching circuit and said first end of said first resistor are connected to a first node;

a Zener diode, wherein a cathode of said Zener diode, a second end of said second resistor and said controlling unit are connected to a second node, wherein said second detecting signal is outputted from said second node; and a third resistor, wherein a first end of said third resistor, said controlling unit, an anode of said Zener diode and a second end of said first resistor are connected to a third node, wherein a second end of said third resistor is connected to a ground terminal, and said first detecting signal is outputted from said third node.

5. The anti-theft charging system according to claim 4, wherein said protecting circuit comprises a first diode, wherein said standby voltage is received by an anode of said first diode.

6. The anti-theft charging system according to claim 5, wherein said protecting circuit comprises a fourth resistor, wherein a first end of said fourth resistor, a cathode of said first diode and a second end of said fourth resistor are electrically connected with said first node.

7. The anti-theft charging system according to claim 3, wherein said switching circuit comprises:
a NPN bipolar junction transistor, wherein a base of said NPN bipolar junction transistor is electrically connected with said controlling unit for receiving said control signal, and an emitter of said NPN bipolar junction transistor is connected with a ground terminal; and a PNP bipolar junction transistor, wherein a base of said PNP bipolar junction transistor is electrically connected with a collector of said NPN bipolar junction transistor, an emitter of said PNP bipolar junction transistor receives said driving voltage, and an collector of said PNP bipolar junction transistor is connected with said first end of said first resistor of said solenoid switch, wherein said base of said NPN bipolar junction transistor is said control terminal of said switching circuit, said emitter of said PNP bipolar junction transistor is said input conduction terminal of said switching circuit, and said collector of said PNP bipolar junction transistor is said output conduction terminal of said switching circuit.

8. The anti-theft charging system according to claim 7, wherein said switching circuit further comprises:
a fifth resistor electrically connected within said controlling unit and said base of said NPN bipolar junction transistor; and
a sixth resistor electrically connected between said collector of said NPN bipolar junction transistor and said base of said PNP bipolar junction transistor.

9. The anti-theft charging system according to claim 3, wherein said impedance detecting unit further comprises a second diode, wherein an anode of said second diode is electrically connected with a ground terminal, and a cathode of said second diode is electrically connected with said output conduction terminal of said switching circuit and said first end of said first resistor.

* * * * *